(12) United States Patent
Scardovi

(10) Patent No.: US 7,370,528 B2
(45) Date of Patent: May 13, 2008

(54) SYSTEM FOR DETECTING THE LEVEL OF LIQUID IN A TANK

(75) Inventor: Alessandro Scardovi, Todi (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 11/819,248

(22) Filed: Jun. 26, 2007

(65) Prior Publication Data
US 2007/0245823 A1 Oct. 25, 2007

Related U.S. Application Data

(62) Division of application No. 10/520,412, filed as application No. PCT/IT2003/000427 on Jul. 8, 2003, now Pat. No. 7,249,506.

(30) Foreign Application Priority Data
Jul. 10, 2002 (IT) .......................... TO2002A0601

(51) Int. Cl.
*G01F 23/26* (2006.01)
(52) U.S. Cl. .................................. 73/304 C
(58) Field of Classification Search ............. 73/304 C
See application file for complete search history.

(56) References Cited

U.S. PATENT DOCUMENTS

| 3,375,716 A | 4/1968 | Walter |
| 4,283,719 A | 8/1981 | Williams et al. |
| 4,853,718 A | 8/1989 | Buhler et al. |
| 5,103,368 A * | 4/1992 | Hart .......................... 361/284 |
| 5,162,817 A | 11/1992 | Tajika et al. |
| 5,613,398 A | 3/1997 | Lawson |
| 6,086,179 A | 7/2000 | Kishi |
| 2005/0174397 A1 | 8/2005 | Scardovi et al. |

FOREIGN PATENT DOCUMENTS

| EP | 1 125 748 | 8/2001 |
| IT | 1233061 | 1/1989 |

* cited by examiner

*Primary Examiner*—Hezron Williams
*Assistant Examiner*—Paul M West
(74) *Attorney, Agent, or Firm*—Venable LLP; Robert Kinberg; Steven J. Schwarz

(57) ABSTRACT

The detecting system comprises a detecting circuit (1) made up of a transistor (T1) in current generator configuration, connected in series with a resistance (Rs) and a capacitor (13) of known capacitance (Cx), the resistance Rs representing the resistivity of the liquid existing between two electrodes (5, 6) plunged into the liquid. Thanks to the presence of the capacitor (13), it is possible to detect the liquid level in relation to the integral of the current that charges the capacitor (13), resistance Rs being such as to condition the charge time (Tp) of the capacitor (13). Accordingly, the variations in the voltage drop (Vp) on Rs caused by successive charges of the capacitor (13) with a current of time Tp represent corresponding values of the level of the liquid.

5 Claims, 2 Drawing Sheets ial, and provided with high porosity which,
SYSTEM FOR DETECTING THE LEVEL OF LIQUID IN A TANK

CROSS-REFERENCE TO RELATED APPLICATIONS

This application is a divisional of U.S. application Ser. No. 10/520,412 filed on Jan. 6, 2005 now U.S. Pat. No. 7,249,506, which is a U.S. National Phase Application Under 35 § USC 371 claiming the benefit of priority of PCT/IT2003/000427 filed on Jul. 8, 2003, which was published Under PCT Article 21(2) in English, and of Application No. TO2002A000601 filed in Italy on Jul. 10, 2002. The contents of the aforementioned applications are incorporated by reference herein.

TECHNICAL FIELD

This invention relates to a system for detecting the level of a liquid in a tank, and more particularly the level of ink contained in the cartridge of an ink jet printhead.

BRIEF DESCRIPTION OF THE STATE OF THE ART

Various devices and relative methods are known in the sector art, and in particular in the field of ink jet printers, for detecting the residual ink quantity, or the level of ink in the cartridge of the printhead, the most widely used of which may be divided into the following categories:

devices for detecting the residual quantity of ink by means of float systems;

detecting devices that use the measurement of a rapid variation of the electrical resistance of the ink between two electrodes, when one of these remains uncovered, of the ON-OFF type;

finally, detecting devices that use the measurement of the variation of the resistance of the ink between two electrodes placed in a porous body impregnated with ink.

These devices have drawbacks of different types, such as lack of precision, mechanical failures and jamming for all the float detector types, lack of precision and incorrect measurement of the resistance of the ink for all the other types of detectors, mainly on account of the fact that the resistance is highly dependant on the temperature and on the composition of the ink.

What is more, the residual ink quantity detecting devices known in the sector art are unsuitable for working in the presence of electrically non-conducting liquids, such as for instance oily liquids and liquids derived from crude oil.

SUMMARY DESCRIPTION OF THE INVENTION

One object of this invention, therefore, is to overcome the drawbacks found in the type of detectors known in the art and classified above.

Another object of the invention is to produce a system for detecting the level of a liquid in a tank in such a way that the indication of the level of the liquid is independent of the influence of parameters, such as temperature, composition of the liquid, in particular an ink, and any errors in the dimensions and position of the detecting electrodes.

Finally a further object of this invention is to produce a system for detecting the level, or quantity of liquid in a tank, filled with an electrically non-conducting liquid.

Therefore in accordance with the stated objects of this invention, a system is proposed for detecting the level of a liquid in a tank, the detecting system comprising:

at least two electrodes (5, 6) extending into the inside of said tank (2), in contact with said liquid, said electrodes (5, 6) being separated by a volume of liquid (8) presenting an own electrical resistance (Rs) variable in function of the level of the liquid in said tank, and influenced by environmental conditions and by physical properties of said liquid, detecting means (1) electrically connected to said electrodes (5, 6), and a control unit (CPU) suitable for controlling said detecting means, characterized as defined in the main claim.

These and other characteristics of the invention will appear more clearly from the following description of a preferred embodiment, provided by way of non-restrictive example, with reference to the figures of the accompanying drawings.

DETAILED DESCRIPTION OF THE INVENTION

Figure 2:
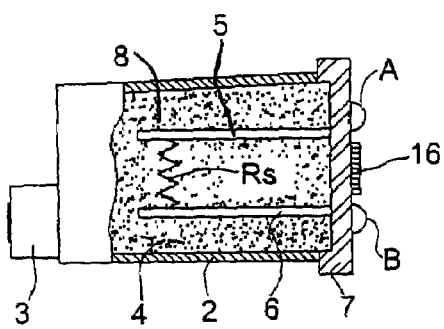
FIG. 2 depicts schematically one of the arrangements of the electrodes inside the ink cartridge.

Although the discovery according to this invention may be used for measuring the level of any liquid contained in a tank, the description that follows focuses, for simplicity's sake, on an application, certainly non-restrictive, of the system for detecting the level of a liquid used for measuring the ink level of a cartridge 2 (FIG. 2) of an ink jet printhead 3, integral with the cartridge 2.

As a non-restrictive, illustrative example of the above-mentioned application, reference is made to use of the printhead 3 on slip printing equipment, used at points of sale (POS) in shopping centres, such as that described in the Italian patent application No. TO 2002 000428, filed by the Applicant, which may be consulted for greater details about using the system for detecting the level of a liquid according to this invention.

The ink jet printhead 3 is of a type widely known in the sector art, and is therefore not described in detail, the reader being referred instead to Italian patent no. 1.233.061, for example.

The cartridge 2 contains a spongy body 4 of electrically insulating material and provided with high porosity which, when the cartridge is new, is completely impregnated with ink, which is held on the inside by capillarity.

Two metallic electrodes 5 and 6 are attached to a lid 7 of the cartridge 2, located at the opposite end with respect to the printhead 3, and extend inside the spongy body 4; the electrodes 5 and 6 are therefore maintained in contact with the ink contained in the cartridge 2.

The two electrodes 5 and 6 are arranged at a distance from one another, functionally pre-established so as to define between them a volume 8 of ink, which presents a determined electrical resistance Rs to the passage of an electrical current of constant and defined intensity.

Gradually as the ink is consumed by the head 3 for printing, the spongy body 4 empties, the ink inside the spongy body 4 recedes starting from the lid 7, in the direction of the printhead 3. The volume 8 of ink between the electrodes 5 and 6 diminishes, and as a result the resistance Rs increases in value.

Figure 3:
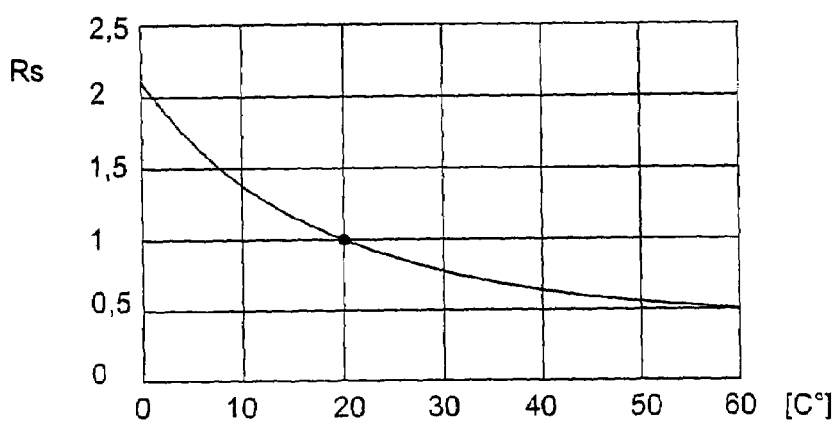
FIG. 3 shows a diagram of the standard variation of resistivity of the ink with ambient temperature.

In practice, however, the resistance Rs is influenced by other parasitic parameters that modify its value, causing errors during the detection of the level of ink in the cartridge 2, if they are not taken into due consideration. These parasitic parameters are first and foremost the environmental conditions that the cartridge 2 is in at the time the level of ink is measured, and the chemical composition of the ink. The environmental condition that most influences the resistance Rs is temperature. FIG. 3 shows a typical trend of the variation of the value of the resistance Rs, or resistivity, upon variation of the ambient temperature. It may be noted that, for the most commonly used types of ink in ink jet printers, in the ambient temperature range from 10° C. to 30° C., resistivity of the ink varies on average from 1.6 to 0.8 approximately, once the resistivity at 20° C. has been fixed at 1.

The main object of this invention, therefore, is to be able to detect the level of the ink in the cartridge 2, regardless of the influence of the parasitic parameters mentioned above.

Figure 1:
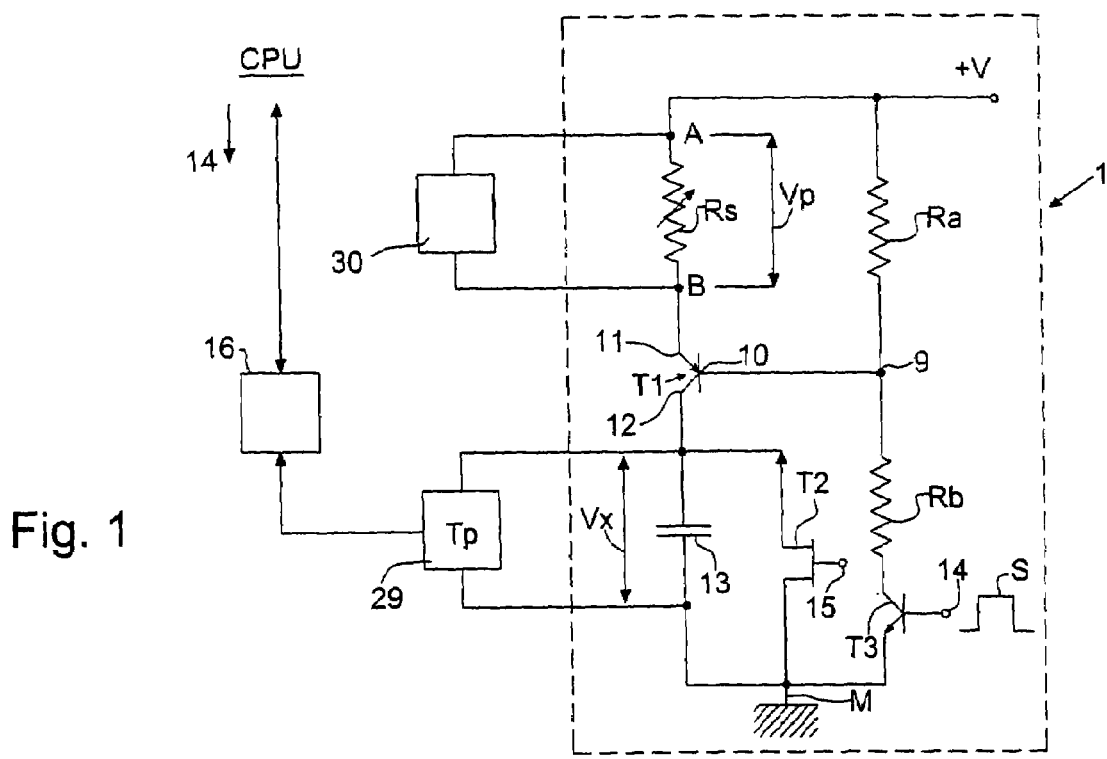
FIG. 1 represents a wiring diagram of the detecting system according to the invention.

With reference to FIG. 1, the numeral 1 is used to indicate as a whole a detecting circuit, comprising the detecting means according to the invention. The circuit 1 comprises a transistor T1, configured as a current generator, polarized by means of two fixed resistances Ra and Rb, fed with power by a voltage source +V; the point 9 of common connection of the resistances Ra and Rb is connected to the base 10 of transistor T1.

The emitter 11 of T1 is connected to one end B of the resistance Rs, i.e. it is connected to the corresponding electrode 6 (FIG. 2) of the cartridge 2, whereas the other end A of the resistance Rs, corresponding in turn to the electrode 5, is directly connected to the source +V.

In order to render measurement of the level of ink independent of the influence of the parasitic parameters mentioned earlier, according to the invention a capacitor 13, of known and constant capacitance Cx, has been included in the circuit of FIG. 1. The capacitor 13 is connected between the collector 12 of T1 and the common earth M.

An FET transistor T2 is connected in parallel to the ends of the capacitor 13, its function being to discharge the capacitor 13, after each measurement, in order to re-establish its starting conditions for a new measurement. For this purpose, the transistor T2, normally inactive, is activated by a pulse applied in a known way to the gate 15.

A third transistor T3 is placed in series with the resistances Ra, Rb, between the resistance Rb and the earth M. The transistor T3 is normally inactive, but is activated by means of a signal S generated by the CPU, of predefined duration, as will be described later, and applied to the base 14 of the transistor T3, only when it is necessary to make the transistor T1 conducting, i.e. when the level of ink has to be measured.

Inclusion of the capacitor 13 permits generation of a signal representing the level of liquid, namely of ink in the cartridge 2, no longer proportional to the current flowing through a reference resistance in series with the resistance offered by the ink, as was known in the sector art, for example as in a device described in U.S. Pat. No. 5,162,817, but proportional to the integral of the current. This leads to a different form of behaviour of the circuit 1, when it is powered with a constant current I.

In fact, if we indicate with Vp the voltage drop measured on the terminals A, B of the resistance Rs, with Vx the voltage on the terminals of the capacitor 13 of capacitance Cx, we obtain the relation 1):

$$Vx=(Tp\ Vp)/(Cx\ Rs) \qquad 1)$$

in which Tp indicates the duration of the time to charge the capacitor 13 up to a voltage Vx, i.e. the driving time of the circuit 1. However the voltage drop Vp, being proportional to the resistance Rs, will also suffer the variations due to the above-mentioned parasitic parameters, and will not give a true indication if used as a quantity representing the level of ink.

If the relation 1) is interpreted in another way, where the voltage Vx is considered to be constant, the following relation 2), derived from 1), is obtained:

$$Vp=Vx\ Cx\ Rs/Tp, \qquad 2)$$

in which the driving time Tp is now the quantity proportional to Rs.

In other words, by using a certain cartridge 2, and by driving the circuit 1 with a current I until a prefixed voltage Vx is obtained, depending for instance on the dynamics of the A/D conversion equipment 29, a driving time Tp1 is obtained, that can easily be measured by means of a digital counter 30 and stored in a memory, for instance in a memory 16 (FIGS. 1, 2) located on board the cartridge itself.

Afterwards, as the ink in the cartridge 2 is gradually used for printing, by subsequently driving the circuit 1 with a pulse of current I of duration equal to the time Tp1, corresponding values of the voltage drop Vx may be measured, which will give a true representation of the pattern of the level of the ink as they are no longer affected by the influences of the parasitic parameters, now automatically compensated for by the value of Tp1. Therefore in this mode of operation of the circuit 1, just described, the voltage drop on the terminals of the capacitor 13 is truly representative of the level of ink contained in the cartridge 2.

Method of Measuring the Level of Liquid

The method of measuring the level of a liquid contained in a tank, and in particular the level of ink in a cartridge 2 of an ink jet printhead 3, is conducted according to the following steps:

step 1): each newly produced cartridge, filled with a certain type of ink, black or colour, is connected to the circuit 1, which is powered with a current I;

step 2): the ambient temperature surrounding the new cartridge is measured;

step 3): the counter 30 is used to measure the driving time Tp used to reach a voltage Vx that is fixed in advance and suitable for the characteristics of the converting/measuring device 29 used for digitizing and measuring the voltages;

step 4): the time Tp measured in step 3) is associated with a standard ambient temperature of 20° and is stored in the non-volatile memory 16 fixed on board the cartridge 2; this measured time Tp represents the maximum value of the level of ink contained in the new cartridge 2;

step 5): in use with the cartridge 2, mounted on printing equipment and connected to the detecting circuit 1, still controlled by the CPU, the ambient temperature of the cartridge during the operating step is measured;

step 6): the detecting circuit 1 is powered with a pulse of current I of duration equal to the driving time Tp, taken from the memory 16, and the voltage drop Vx on the terminals of the capacitor 13 is measured, before being converted by the converter 29, connected to the control unit or CPU;

step 7): the measurement of Vx is associated with the temperature of 20°, in such a way as to obtain the corresponding value of the level of ink, converted according to a suitable scale;

step 8): the measurement is repeated as in steps 6) and 7), each time the value of level of the ink in the cartridge 2 needs to be known;

step 9): the cartridge 2 is replaced when a voltage drop Vx is detected on the capacitor 13 equal to or less than a previously calculated limit value, indicative of a situation of cartridge empty.

FIG. 3 shows the influence of the ambient temperature on the resistance of various inks; the diagram of FIG. 3 is drawn in dimensionless and normalized form, in which the value 1 on the ordinates corresponds to the resistance of the ink at 20° C.

Figure 4:
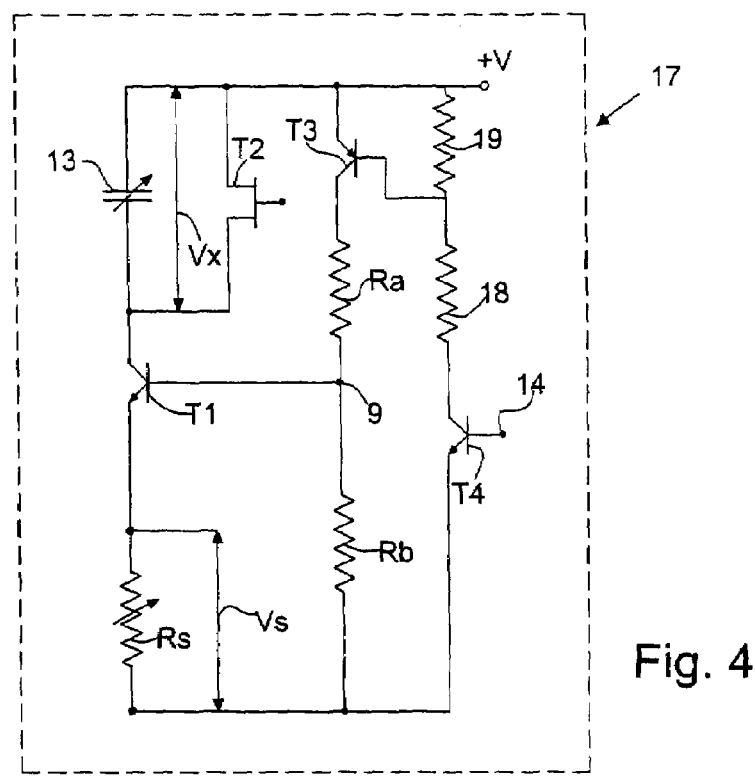
FIG. 4 represents a different embodiment of the detecting system of FIG. 1.

FIG. 4 represents a different embodiment 17 of the detecting circuit 1 of FIG. 1, suitable for use with digitizing and measuring equipment having a floating input, i.e. not referred to the earth; in the circuit 17 the resistance Rs and the capacitor 13 are changed over and the transistor T3 is connected between the +V pole and the resistance Ra; a transistor T4 has been added together with the charging 18 and polarizing 19 resistance of T3; this addition does not affect global operation of the circuit 17.

Figure 5:
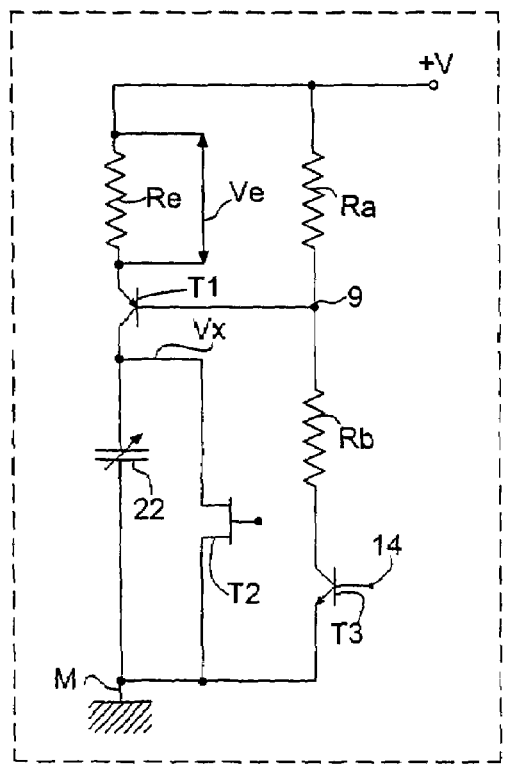
FIG. 5 represents a version of the device of FIG. 1 adapted for dielectric liquids.

FIG. 5 shows a detecting circuit 20 equivalent to that of FIG. 1, and which therefore works in the same way, suitable for non-conducting, or dielectric, liquids, such as for example liquids used in the chemical industry, liquids derived from crude oil, mineral oils, or vegetable oils, etc.

Figure 6:
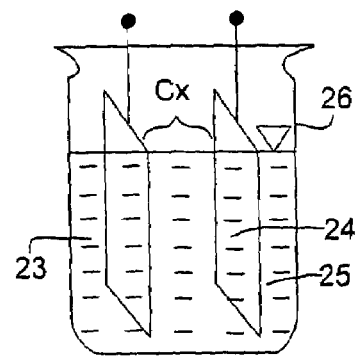
FIG. 6 represents schematically the disposition of a pair of capacitive electrodes for dielectric liquids.

The capacitor 22 represents the capacitance Cx of a pair of electrodes 23 and 24 (FIG. 6), facing one another and immersed in the liquid 25, the level of which in a tank 26 has to be measured. The capacitance Cx varies depending on the level of the liquid in the tank 26, as a portion of the electrodes remains uncovered and therefore the dielectric constant which defines the capacitance Cx varies as a result.

Figure 7:
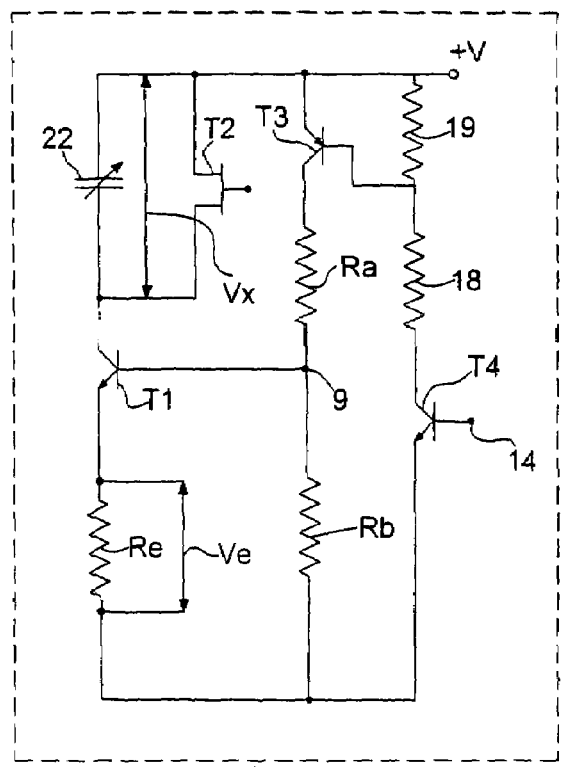
FIG. 7 shows a variant of the diagram of FIG. 5.

Finally the circuit 27 of FIG. 7 is a detecting circuit equivalent to that of FIG. 5, in which the resistance Re and the capacitor 22 are changed over, should the voltage drop Ve be measured by floating input equipment, without earth reference.

It remains understood that changes, additions or component part substitutions may be made to the system for detecting the level of a liquid in a tank, according to this invention, without departing from the scope of this invention.

What it is claimed:

1. System for detecting the level of a liquid in a tank, comprising:
    at least two electrodes extending into the inside of said tank, in contact with said liquid, said electrodes constituting a capacitor, the capacitance of which is variable in relation to the level of the liquid in said tank,
    detecting means electrically connected to said electrodes, and
    a control unit suitable for controlling said detecting means,
    wherein said detecting means comprise a resistance connected in series to said capacitor and a current generator connected in series between said resistance and said capacitor, said current generator being suitable for being activated by said control unit for powering said resistance and for charging said capacitance with said current until a predefined voltage is reached on the terminals of said capacitance, during a corresponding charge time, representative of the current level of said liquid in said tank, and wherein said control unit is prearranged for storing said charge time in a memory and for activating at later times said generator for a duration equal to said stored charge time, so that said capacitance is charged with a current such as to produce on said capacitance a voltage drop proportional to the variation of said capacitance caused by a corresponding variation of the level of said liquid.

2. Detecting system as in claim 1, wherein said liquid is dielectric, having a defined dielectric constant and influenced by said environmental conditions and by said physical properties.

3. Detecting system as in claim 1, wherein said liquid is a derivative of crude oil.

4. Detecting system as in claim 1, wherein said liquid is a mineral oil.

5. Detecting system as in claim 1, wherein said liquid is a vegetable oil.

* * * * *